United States Patent Office 2,705,649
Patented Apr. 5, 1955

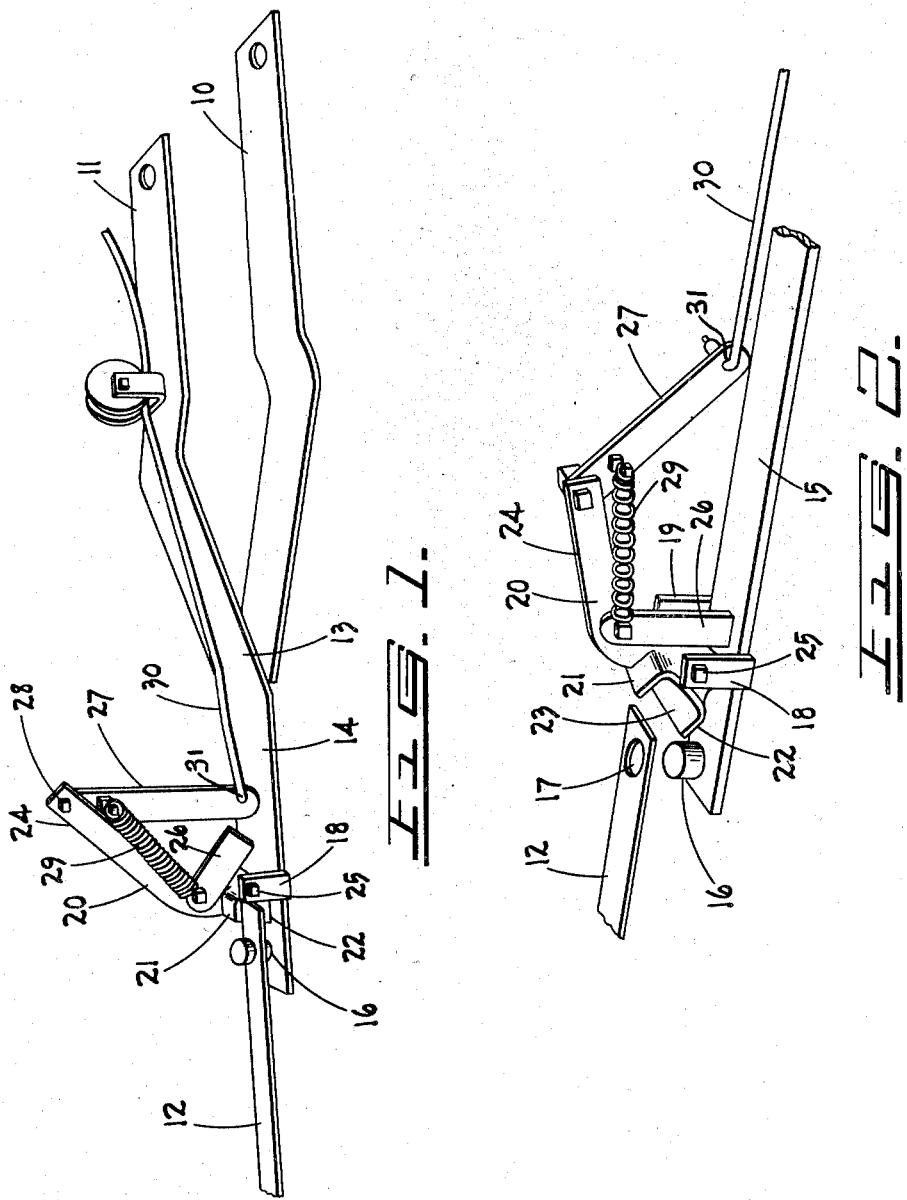

2,705,649

REMOTELY OPERABLE RELEASABLE VEHICLE COUPLING

Everett P. Collier, Brantford, Ontario, Canada, assignor to Cockshutt Farm Equipment, Limited, Brantford, Ontario, Canada, a corporation of Canada Application June 1, 1953, Serial No. 358,879

Claims priority, application Canada February 21, 1953

3 Claims. (Cl. 280—504)

This invention relates to a releasable coupling. This invention provides a coupling which is particularly suitable for hitching a trailing wagon to a forage harvester, although it will be understood that the invention is not limited to the use of the coupling for this purpose. The present practice is to couple a trailing wagon to the draw bar of the forage harvester by means of a loose pin. After the wagon has been filled it is necessary for the operator to dismount from the tractor and remove the draw pin, then to drive the tractor ahead so that a second wagon may be coupled to the harvester.

An object of the present invention is to provide a coupling which can be released by pulling a release cable. This release cable can be made to extend to the tractor. It will not therefore be necessary for the tractor operator to dismount.

Another object of this invention is to provide a coupling in which the possibility of accidental release is minimized.

The manner in which these objects are accomplished will be apparent from the detailed description and appended claims.

In the drawings which illustrate the preferred embodiment of this invention:

Figure 1 is a perspective view of the preferred embodiment of this invention, showing the coupling in the locked position, Figure 2 is a perspective view, showing the coupling in the release position.

Figure 1 shows the draw bars 10 and 11 of a forage harvester connected by a coupling in accordance with this invention to a trailer pole 12. Draw bars 10 and 11 are joined together at 13 and draw bar 11 has an extension 14 upon which the coupling is mounted. A single draw bar 15 may also be coupled to the trailer pole 12 as shown in Figure 2.

The draw bar 15 or draw bar extension 14 is fitted with an upright post 16 which slidably engages an aperture or slot 17 in the trailer pole. A pair of supporting brackets 18 and 19 are mounted on the draw bar 15 or draw bar extension 14 to afford a pivotal mounting for release arm 20.

Release arm 20 has a laterally projecting upper jaw 21 and a laterally projecting lower jaw 22 defining a channel 23, and also includes an upwardly extending lever portion 24. The release arm is pivotally mounted between brackets 18 and 19 by pin 25. The lever portion 24 of the release arm is shown as being angularly inclined in a direction away from trailer pole 12. Release arm 20 includes a rigidly attached stop link portion 26 which abuts against the drawbar to limit the biasing of the release arm.

A safety link 27 is pivotally connected at 28 to the upper end of release arm 20. This safety link abuts against the draw bar when the coupling is in the locked position, as shown in Figure 1. A tension spring 29 is connected between the stop link portion of release arm 20 and safety link 27 and tends to decrease the angle between the release arm and the safety link. A pull cable 30 is attached at 31 to the lower end of the safety link and extends in a direction substantially opposite to the force on the safety link applied by spring 29. The cable passes through guide pulley 32 and thence to a suitable position, for example on the tractor (not shown) for the manual control of the release of the coupling.

As will be apparent from Figure 1, jaw 21 extends over the end of trailer pole 20 and acts to prevent the accidental dislodgement of the trailer pole from post 16 when the coupling is in locked position. In addition, safety link 27 acts as a brace to prevent release arm 20 swinging about its fulcrum to release the coupling. Spring 29 retains the safety link in locking position. When tension is applied to cable 30 safety link 27 swings in the direction of pull against the tension of spring 29, thus causing release arm 20 to bias about its pivotal mounting to the position shown in Figure 2. Lower jaw 22 which extends beneath trailer pole 12 raises the trailer pole from post 16 and at the same time upper jaw 21 is swung out of locking position to permit the release of the trailer pole. This is achieved by locating the axis of post 16 tangentially to the direction of circular movement of jaws 21 and 22.

When the tension on cable 30 is released spring 29 will automatically restore release arm 20 to locking position.

It will be apparent from the foregoing that this invention provides a simple, practical and convenient coupling. The various safety features which have been included minimize the chance of accidental release. The use of a coupling releasable by tension on a cable is particularly convenient where three vehicles are connected in series and an operator in the front vehicle wishes to release the rear vehicle, as the coupling can be mounted on the central vehicle and a cable can be provided which is of sufficient length to extend to the front vehicle.

I claim:

1. A releasable coupling between two members comprising an upright post on one member cooperating with an aperture in the other member, an upwardly extending release arm pivotally mounted on said one member, upper and lower jaws extending from said release arm, the lower jaw below said other member and the upper jaw extending above said other member in a locking position to prevent disengagement of said other member from the post, a safety link pivotally connected at its upper end to the upper end of said release arm and extending to said one member to hold said release arm in the locking position of its upper jaw, means connected to the lower end of the safety link to displace the safety link from holding position and to cause the release arm to bias about its pivotal mounting to remove the upper jaw from locking position and simultaneously to lift said other member from the post, thereby releasing the coupling, and spring means connected between the release arm and the safety link and acting to return said safety link to its holding position and to return said release arm to the locking position of its upper jaw.

2. A releasable coupling as in claim 1 in which the means connected to the lower end of the safety link includes a cable extending from the lower end of the safety link in a direction away from said post.

3. A releasable coupling as in claim 1 in which the release arm includes stop means abutting against said one member to limit the biasing of the release arm.

References Cited in the file of this patent

UNITED STATES PATENTS

| 1,073,651 | Wixcel | Sept. 23, 1913 |
| 1,745,136 | Williams | Jan. 28, 1930 |
| 1,860,391 | Meyer | May 31, 1932 |

FOREIGN PATENTS

| 693,134 | Germany | July 3, 1940 |